(12) United States Patent
Derckx et al.

(10) Patent No.: US 11,721,126 B2
(45) Date of Patent: Aug. 8, 2023

(54) METHOD TO AUTHENTICATE A USER IN AN ELECTRONIC DEVICE COMPRISING A FINGERPRINT SENSOR

(71) Applicant: TOUCH BIOMETRIX LIMITED, Wales (GB)

(72) Inventors: Henricus Derckx, St Asaph (GB); Wilhelmus Van Lier, St Asaph (GB); Michael A. Cowin, St Asaph (GB); Davide Maltoni, Bertinoro FC (IT)

(73) Assignee: TOUCH BIOMETRIX LIMITED, St. Asaph (GB)

( * ) Notice: Subject to any disclaimer, the term of this patent is extended or adjusted under 35 U.S.C. 154(b) by 0 days.

(21) Appl. No.: 17/629,104

(22) PCT Filed: Jul. 23, 2020

(86) PCT No.: PCT/GB2020/051773
§ 371 (c)(1),
(2) Date: Jan. 21, 2022

(87) PCT Pub. No.: WO2021/014162
PCT Pub. Date: Jan. 28, 2021

(65) Prior Publication Data
US 2022/0277583 A1 Sep. 1, 2022

(30) Foreign Application Priority Data

Jul. 23, 2019 (GB) ........................... 1910543
Jul. 24, 2019 (EP) ........................... 19188208
Sep. 26, 2019 (GB) ........................... 1913890

(51) Int. Cl.
*G06V 40/12* (2022.01)
*G06V 10/74* (2022.01)
(Continued)

(52) U.S. Cl.
CPC .......... *G06V 40/1371* (2022.01); *G06F 21/32* (2013.01); *G06V 10/761* (2022.01);
(Continued)

(58) Field of Classification Search
CPC .. G06V 40/1371; G06V 10/761; G06V 40/13; G06V 40/1353; G06V 40/50;
(Continued)

(56) References Cited

U.S. PATENT DOCUMENTS

| 2014/0079300 A1* | 3/2014 | Wolfer | G06V 40/13 |
| | | | 382/124 |
| 2015/0161368 A1* | 6/2015 | Stewart | G06V 40/1365 |
| | | | 726/19 |

(Continued)

OTHER PUBLICATIONS

Combined Search & Examination Report issued in Appl. No. GB2001452.6 (dated Aug. 23, 2021).
(Continued)

*Primary Examiner* — Premal R Patel
(74) *Attorney, Agent, or Firm* — Barnes & Thornburg LLP

(57) ABSTRACT

A method to authenticate a user by means of a fingerprint sensor, which is capable of simultaneously acquiring the fingerprints of a hand, the method comprising: an enrollment process (100), during which the features of first fingerprints (Ei) of the fingers of the hand are acquired (101-103), a variation model (Gij) indicating a plausible mutual position variation for each pair of first fingerprints (Ei, Ej) is determined (104) based on the respective features and stored (105); and a comparison process (200), during which features of successive fingerprints (Ei, Ej) of the fingers of the hand are acquired (201-203), a degree of similarity between each one of the first fingerprints (Ei) and each one of the successive fingerprints (Ck) is determined (204) based on a comparison of the respective features, a degree of plausi-
(Continued)

bility of mutual position of pairs of fingerprints ($\langle E_i, C_{ki}\rangle$, $\langle E_j, C_{kj}\rangle$) of a set (P) of pairs of fingerprints, each comprising one of the first fingerprints ($E_i$) and that of the successive fingerprint ($C_{ki}$) offering the highest degree of similarity, is determined (207, 208) based on the features of the pairs of fingerprints and on the variation model ($G_{ij}$) of the first fingerprints ($E_i$, $E_j$) of the pairs of fingerprints, the user is recognized (209-211) and the variation models ($G_{ij}$) are updated (212) based on the degrees of similarity and on the mutual position plausibility degrees.

12 Claims, 8 Drawing Sheets

(51) Int. Cl.
  *G06V 40/13* (2022.01)
  *G06V 40/50* (2022.01)
  *G06F 21/32* (2013.01)

(52) U.S. Cl.
  CPC .......... *G06V 40/13* (2022.01); *G06V 40/1353* (2022.01); *G06V 40/50* (2022.01)

(58) Field of Classification Search
  CPC .... G06V 40/11; G06V 40/70; G06V 40/1365; G06F 21/32
  See application file for complete search history.

(56) References Cited

U.S. PATENT DOCUMENTS

2020/0184191 A1\* 6/2020 Thompson ......... G06V 40/1365
2021/0166047 A1\* 6/2021 Juncker ................. G06F 3/0416

OTHER PUBLICATIONS

Int'l Search Report & Written Opinion issued in Appl. No. PCT/GB2020/051773 (dated Nov. 23, 2020).
Karm Veer Arya et al., "The Biometric Computing: Recognition and Registration," CRC, pp. 144-160 (Jan. 1, 2020).
Puneet Gupta et al. "An accurate slap fingerprint based verification system," Neurocomputing, vol. 188, pp. 178-189 (Dec. 19, 2019).
Puneet Gupta et al., "An efficient slap image matching system based on dynamic classifier selection and aggregation," Information Sciences, vol. 417, pp. 113-127 (Jun. 30, 2017).

\* cited by examiner

METHOD TO AUTHENTICATE A USER IN AN ELECTRONIC DEVICE COMPRISING A FINGERPRINT SENSOR

CROSS-REFERENCE TO RELATED APPLICATIONS

This application is a US national stage application under 35 USC § 371 of PCT Application No. PCT/GB2020/051773, filed on Jul. 23, 2020, which claims priority from United Kingdom Application Numbers 1910543.6, filed on Jul. 23, 2019, and 1913890.8, filed on Sep. 26, 2019 and EPO Application No. 19188208.3, filed on Jul. 24, 2019, the entirety of each are hereby fully incorporated by reference herein.

The invention relates to a method to authenticate a user in an electronic device comprising a fingerprint sensor, which is capable of simultaneously acquiring a plurality of fingerprints of a hand.

In particular, the invention finds advantageous, though non-exclusive application in mobile communication devices and, in particular, in so-called smartphones, in which the fingerprint sensor is built-in in a relatively large-sized touchscreen, to which explicit reference will be made in the description below without because of this losing in generality.

A user is usually authenticated in a smartphone having a touchscreen and a fingerprint sensor built-in in the touchscreen by performing a general enrollment process, which is typically carried out during the first use of the smartphone and during which first fingerprint data of a hand is acquired by means of the fingerprint sensor, is processed in order to extract features of the fingerprints and said features are stored in a memory of the smartphone, and a comparison process, which is typically carried out each time the user wants to unlock the screen of the smartphone and during which successive sets of fingerprint data of the hand are acquired by means of the fingerprint sensor and are processed to extract the corresponding features, which are compared with the features stored in the memory in order to check whether they belong to the same user.

The fingerprint data acquired with the sensor typically consists of a fingerprint image concerning a hand and detected in the area of the touchscreen.

In particular, a fingerprint user authentication method is known, wherein, both during the enrollment process and during the comparison process, fingerprint data of different fingers of a hand are acquired, and—therefore—the processing of this data must include isolating the fingerprints of the single fingers in order to extract the minutiae of each single fingerprint. Furthermore, the processing of the fingerprint data comprises the verification of the geometry of the fingers of the hand in order to increase the items of information available and, hence, make the authentication more reliable. However, this method only works if the fingers are forced to touch the touchscreen in predetermined positions and, in particular, when they are stretched out and contiguous to one another. The aforesaid limit evidently decreases the user's comfort during the authentication, for example it slows down the smartphone screen unlocking operation, if this operation is bound to the recognition of the user.

The object of the invention is to provide a user authentication method operating with multiple fingerprints, which is not affected by the aforementioned drawbacks and, at the same time, can be carried out in a straightforward and low-cost manner.

Aspects of the invention are set out in the independent claims. Optional features are provided in the dependent claims. According to the invention, there are provided a method to authenticate a user in an electronic device, an electronic device and a computer program product as set forth in the appended claims.

In an aspect, there is provided a method to authenticate a user in an electronic device comprising a fingerprint sensor, which is capable of simultaneously acquiring a plurality of fingerprints of a hand. The method comprises an enrollment process, during which first fingerprint data of a hand is acquired by means of the fingerprint sensor and processed in order to determine features of first fingerprints of respective fingers of the hand and said features are stored in memory means of the electronic device. The method comprises a comparison process, during which successive fingerprint data of a hand is acquired by means of the fingerprint sensor and processed in order to determine features of successive fingerprints of respective fingers of the hand to be compared with the features of the first fingerprints. The enrollment process comprises: (i) for each one of the possible pairs of first fingerprints, initializing a respective variation model indicating a plausible variation of the mutual position of the two fingerprints based on the respective features; and (ii) storing the variation models of each pair of the first fingerprints in said memory means. The comparison process comprises: (i) determining a degree of similarity between each one of the first fingerprints and each one of the successive fingerprints based on a comparison of the respective features; (ii) populating a set of pairs of fingerprints, each pair comprising one of the first fingerprints and that of the successive fingerprint which offers the highest degree of similarity; (iii) determining a degree of plausibility of the mutual position of each pair relative to every other pair of said set of pairs of fingerprints based on the features of the first and successive fingerprints of the two pairs of fingerprints and based on the variation model concerning the first fingerprints of the two pairs of fingerprints; (iv) recognizing the user based on the degrees of similarity between said first fingerprints and said successive fingerprints and on the degrees of plausibility of the mutual position of the pairs of said set of pairs of fingerprints; and (v) updating said variation models based on said degrees of similarity and on said degrees of plausibility of the mutual position.

The enrollment process may enable data to be obtained for an authenticated user. In other words, first fingerprint data obtained in the enrollment process may be that against which future authentication is based. Data for multiple users may be obtained and stored, such that any of a number of users may be deemed to be authenticated users. Successive (e.g. subsequent) fingerprint data of a hand which is obtained may then be compared with the stored data from the enrollment process to determine whether that hand corresponds to a hand of an authenticated user.

The successive (e.g. subsequent) fingerprint data may be obtained after the enrollment process. Operation of the electronic device may be controlled based on whether a verified user of the device is authenticated by their fingerprint data. Successive fingerprint data may comprise fingerprint data from a hand which contacts the sensor after enrollment process has finished.

A variation model may comprise data which indicates of an expected position of the user's fingerprints and/or an expected displacement between the user's fingerprints. The variation model may provide an indication of the likelihood of a user's fingerprint being located in any of a plurality of regions on the sensor. The variation model may be based on measured data for the user's fingerprints when contacting the sensor, and e.g. a variation in the locations with which that fingerprint contacts the sensor. The variation model may not comprise a model per se.

For any given pair of first fingerprints, the variation model may provide an indication of a plausible variation of the mutual position of those two fingerprints. The mutual position of two fingerprints may comprise a position of one fingerprint relative to the other fingerprint. In other words, it may indicate a displacement from one fingerprint to the other on the sensor. The mutual position of two fingerprints may comprise an indication of the absolute position of the two fingerprints on the sensor. It may indicate where the two fingerprints are on the sensor, and the displacement between them. Displacement between the two fingerprints may comprise a rotation of one of the fingerprints (e.g. a rotation relative to the other fingerprint).

For each pair of fingerprints, the indication of a plausible variation in the mutual position of the two fingerprints may be based on the position of the two fingerprints in the enrollment process. It may also be based on subsequent fingerprint data obtained for that pair of fingerprints (e.g. when a final global score is greater than a third threshold value).

A plausible variation for any given position on the sensor may comprise a region of the sensor surrounding that position. Each finger may be expected to interact with the sensor in a certain place, e.g. each fingerprint may be expected to contact the sensor at a certain location on the sensor. For each fingerprint, there may be an associated expected contact location. This expected contact location is the location on the sensor that the user's fingerprint is most likely to touch. In practice, each finger may not always touch the exact same spot on the sensor. Subsequent touches of the sensor by the same finger may be clustered around the expected contact location. A variation of contact locations for the fingerprint may occur around the expected contact location.

A subsequent contact location (on the sensor from a fingerprint) within a selected distance from the expected contact location for a given fingerprint (but not exactly at the expected contact location for that fingerprint) may still be determined to be a touch in an expected contact region for that fingerprint. The degree of plausibility that the contact location corresponds to the expected contact location may decrease with increased distance away from the expected contact location on the sensor. A region on the contact sensor surrounding the expected contact location may be defined within which it is determined plausible that fingerprint contact corresponds to the fingerprint associated with that region. This region for each fingerprint may provide an indication of plausible variation for the position of that fingerprint.

For any pair of fingerprints, a plausible variation of the mutual position of the two fingerprints may be defined. A displacement of one fingerprint from the other may have an associated variation. In other words, for a pair of fingerprints, one fingerprint may have an expected contact location on the sensor relative to a contact location of the other fingerprint on the sensor. This may be relative, and not absolute. For example, irrespective of where one fingerprint contacts the sensor, there may be a known relationship from that contact point to an expected contact point of the other fingerprint. A relative relationship may be defined between respective contact points on the sensor from each of the two fingerprints. In practice, the exact contact point of one fingerprint relative to the other may vary.

An expected contact location for one of the fingerprints may be defined based on a sensed contact location for the other fingerprint. A region may be defined which surrounds the expected contact location. The defined region may indicate a variation of contact locations on the sensor for which it is plausible that they relate to the relevant fingerprint.

A plausible variation of the mutual position of the two fingerprints may comprise an indication of an expected contact region on the sensor within which it is deemed plausible that a first of the two fingerprints would contact the sensor, wherein the expected contact region is determined based on a contact location on the sensor for the second of the two fingerprints. The expected contact region is determined based on an expected displacement of the first of the two fingerprints from the second of the two fingerprints.

A variation model indicating a plausible variation of the mutual position of the two fingerprints may comprise data indicating region(s) of the contact sensor within which it is deemed plausible (e.g. there is a likelihood above a threshold amount) that one of the fingerprints will contact the sensor, wherein this region is determined based on a contact location for the other of the fingerprints. The model may provide data regarding (e.g. it may encompass all) expected displacements of the first of the two fingerprints from the second of the two fingerprints. Where two subsequent fingerprints are sensed within an expected displacement range from one another, it may be deemed plausible that these subsequent fingerprints correspond to the first fingerprints. The variation model may comprise a probability distribution for the displacement of the first of the two fingerprints relative to the second.

Initialising a variation model may comprise determining the expected displacements, e.g. determining an expected contact region on the sensor for one of the two fingerprints based on the contact location of the second of the two fingerprints. Updating a variation model may comprise updating the range of expected displacements, e.g. updating the expected contact region. The update may be such that a relative displacement between two subsequent fingerprints determined to correspond to the first fingerprints falls within the updated range of expected displacements.

Determining a degree of similarity between data from a first fingerprint and data from a second fingerprint may comprise calculating a likelihood that the first and second fingerprints are from the same finger. In other words, it may comprise calculating a probability that the features of the first fingerprint are the same as the features of the second fingerprint.

Recognizing the user may comprise controlling authentication of the user based on a determined plausibility of the displacement of each pair of fingerprints. Controlling authentication may comprise granting authentication (e.g. determining that the hand contacting the sensor corresponds to, e.g. belongs to, a hand of an authenticated user) in the event that it is determined that a probability that the fingerprints from the successive hand belong to the same hand as the first fingerprints is above a threshold value. In the event that the probability is below a threshold value, it is determined that the user (the user associated with the successive fingerprints) is not authorised.

Updating the variation models may comprise updating the stored data for at least one of: (i) a plausible variation in the mutual position of the fingerprints and (ii) features of the fingerprints. The update may take into account the successive fingerprint data if it is determined that the successive fingerprint data corresponds to a hand of the user for the first fingerprint data.

Determining features of fingerprints may comprise identifying valleys and ridges in the skin on the fingerprints. Sensed data from the fingerprint sensor may indicate proximity of a region of a user's hand to the sensor. This may be take into account the valleys and ridges of their skin. A contour mapping for these may enable a user's fingerprint to be identified. Features of fingerprints may provide data from which a user may be identified, e.g. sensed data may be unique to a particular user. The features of each one of the first fingerprints may comprise its minutiae and a respective reference point determined based on said minutiae and the features of each one of the successive fingerprints comprise its minutiae. Said reference point may consist of the barycentre of the relating minutiae.

Said variation model may be defined by a bivariate Gaussian function having a mean vector calculated as a function of the features of the corresponding pair of first fingerprints and a covariance matrix. The mean vector may comprise an expected displacement of the first fingertip of the pair from the second fingertip of the pair. The mean vector may provide an indication of an expected contact position for one fingertip of the pair relative to a contact position for the other fingertip in the pair. The plausibility of variation of the mutual position may be distributed according to a Gaussian distribution. The Gaussian function may be centred on the expected contact position of one fingertip relative to the other. The plausibility may decrease with increased distance from this expected contact position. The decrease in plausibility may follow a Gaussian distribution.

Said mean vector may be initialized to an initial displacement vector, which is calculated as a difference vector between the two reference points of the pair of first fingerprints. The covariance matrix may be initialized to a scalar diagonal matrix. It may provide a symmetric probability distribution about the expected contact point, for example, with one or two degrees of symmetry.

The degree of similarity may be defined by a confidence score and by a rototranslation, both determined based on a comparison of features between a first fingerprint and a successive fingerprint. The confidence score may comprise a probability that the features in the first fingerprint correspond to those in the successive fingerprint, e.g. a probability that both features belong to the same hand. The rototranslation may comprise at least one of a rotation and a translation so that the first fingerprint and the successive fingerprint are aligned. For example, the rotation and/or translation required so that the two fingerprints have the highest degree of similarity. For example, the rototranslation may align the first fingerprint with the successive fingerprint.

Each pair of said set of pairs of fingerprints may comprise one of the first fingerprints and that of the successive fingerprints which offers the highest confidence score, and, at the same time, is greater than or equal to a first threshold value. A pair may only be populated if its respective first and successive fingerprints have a degree of similarity above the first threshold value. For example, even if said successive fingerprint has the highest degree of similarity with the first fingerprint (of all the successive fingerprints), the pair will only be populated if that degree of similarity is above the first threshold value. The similarity may be determined based on the confidence score.

Determining a mutual position plausibility degree may comprise computing a displacement vector of each pair relative to every other pair of said set of pairs of fingerprints, based on the reference points of the first fingerprints of the two pairs and on the rototranslations between the first fingerprint and the successive fingerprint of the two pairs. It may comprise computing a probability density of observing the displacement vector, based on the variation model concerning the first fingerprints of the two pairs. Said mutual position plausibility degree may be defined by said probability density. In other words, the degree of plausibility may comprise the probability of sensing the mutual position of the two fingerprints. This probability may be determined using the variation model.

Calculating a displacement vector may comprise applying respective rototranslations to the reference points of the first fingerprints of the two pairs so as to obtain two respective new reference points. It may comprise computing said displacement vector as rotation of a difference vector between the two new reference points, this rotation being equal to an average of the rotation angles of the rototranslations associated with the two pairs. Said probability density of the displacement vector may be computed taking into account a probability density with a bivariate Gaussian distribution, which has a mean vector and a covariance matrix coinciding with the mean vector and with the covariance matrix, respectively, of said variation model concerning the first fingerprints of the two pairs.

Recognizing the user may comprise: (i) computing an initial global score by summing the confidence scores associated with the pairs of said set of pairs of fingerprints; (ii) computing a final global score by consolidating the initial global score by means of the probability density of the displacement vectors between the pairs of said set of pairs of fingerprints; and (iii) assuming that said first fingerprint data and said successive fingerprint data belong to the same user, if the final global score is greater than a second threshold value. Said variation models may be updated if said final global score is greater than a third threshold value. Updating said variation models may comprise, for each variation model concerning two first fingerprints, updating the respective mean vector and the respective covariance matrix according to the displacement vector of those two pairs of said set (P) of pairs of fingerprints comprising the two first fingerprints.

In an aspect, there is provided a method of authenticating a user using an electronic device comprising a fingerprint sensor. The method comprises an enrollment process comprising: obtaining first fingerprint data of a first hand using the fingerprint sensor; determining, and storing, features of first fingerprints of respective fingers of the first hand; and determining, and storing, for each one of the possible pairs of first fingerprints, an indication of plausible displacement between the two first fingerprints on the fingerprint sensor. The method comprises a comparison process comprising: obtaining second fingerprint data of a subsequent hand using the fingerprint sensor; determining features of second fingerprints of respective fingers of the subsequent hand; determining a degree of similarity between each one of the first fingerprints and each one of the second fingerprints based on a comparison of the respective features; identifying pairs of fingerprints, each pair comprising one of the first fingerprints and the second fingerprint which has the highest degree of similarity to said one of the first fingerprints; and determining a plausibility of the displacement of each pair relative to each of the other pairs based on the stored indications of plausible displacement between the possible pairs of first fingerprints. The method comprises controlling authentication of the user based on the determined plausibility of the displacement of each pair of fingerprints.

Determining and storing an indication of plausible displacement between the two fingerprints may comprise initializing and storing a respective variation model indicating a plausible variation of the mutual position of the two fingerprints based on the respective features. This variation model may be stored in memory means of the electronic device. Subsequent (successive) fingerprint data may be obtained. Identifying pairs of fingerprints may comprise populating a set of pairs of fingerprints. Determining a plausibility of the displacement of each pair relative to each of the other pairs may comprise determining a degree of plausibility of the mutual position of each pair relative to every other pair of said set of pairs of fingerprints based on the features of the first and successive fingerprints of the two pairs of fingerprints and based on the variation model concerning the first fingerprints of the two pairs of fingerprints. Controlling authentication of the user based on the determined plausibility of the displacement of each pair of fingerprints may comprise recognizing the user based on the degrees of similarity between said first fingerprints and said successive fingerprints and on the degrees of plausibility of the mutual position of the pairs of said set of pairs of fingerprints.

In the event that it is determined that a likelihood that the subsequent hand corresponds to the first hand is above a third threshold value, methods may comprise updating at least one of: (i) the stored features of the first fingerprints, and (ii) the stored indications of plausible displacement between first fingerprints, wherein said update is based on the second fingerprint data. For example, methods may comprise updating variation models based on the degrees of similarity and on the degrees of plausibility of the mutual position.

The degree of similarity between the first and second fingerprints may be determined based on both: (i) a confidence score of the match of respective features of the first and second fingerprints, and (ii) a rototranslation between the two fingerprints. Pairs of fingerprints may only be identified for pairs where it is determined that the respective first and second fingerprints have a degree of similarity above a first threshold value. For example, each set of pairs of fingerprints may comprise one of the first fingerprints and that of the successive fingerprints which offers the highest confidence score and, at the same time, is greater than or equal to the first threshold value.

Determining the plausibility of the displacement of each pair relative to each of the other pairs may be based on: both (i) a reference point for the first fingerprint for each of the two pairs and (ii) a rototranslation between the first fingerprint and its subsequent fingerprint for each of the two pairs. For example, determining a mutual position plausibility degree may comprise computing a displacement vector of each pair relative to every other pair of said set of pairs of fingerprints, based on the reference points of the first fingerprints of the two pairs and on the rototranslations between the first fingerprint and the successive fingerprint of the two pairs. It may comprise computing a probability density of observing the displacement vector, based on the variation model concerning the first fingerprints of the two pairs. The mutual position plausibility degree may be defined by the probability density.

Controlling authentication of the user may be based on a final global score, which is determined based on both: (i) the determined degree of similarity between the first fingerprints and the second fingerprints, and (ii) the determined plausibility of the displacement of each pair of fingerprints. An initial global score may be computed by summing the confidence scores associated with the pairs of said set of pairs of fingerprints. A final global score may be computed by consolidating the initial global score by means of the probability density of the displacement vectors between the pairs of said set of pairs of fingerprints. In the event that the final global score is greater than a second threshold value, it may be determined that the first and second fingerprint data belong to the same user.

The determined likelihood that the subsequent hand corresponds to the first hand may comprise the final global score, and in the event that the final global score is above the third threshold value, the method comprises updating the at least one of: (i) the stored features of the first fingerprints, and (ii) the stored indications of plausible displacement between first fingerprints, wherein said update is based on the second fingerprint data. For example, if the final global score is greater than a third threshold value, the variation models may be updated.

In an aspect, there is provided an enrollment method of preparing an electronic device comprising a fingerprint sensor to authenticate a user using the fingerprint sensor. The method comprises: obtaining first fingerprint data of a first hand using the fingerprint sensor; determining, and storing, features of first fingerprints of respective fingers of the first hand; and determining, for each one of the possible pairs of first fingerprints, an indication of plausible displacement between the two first fingerprints on the fingerprint sensor; and storing the indication of plausible displacement for each of the possible pairs to enable the electronic device to control authentication of a user based on both: (i) the stored indications of plausible displacement between two first fingerprints, and (ii) second fingerprint data of a subsequent hand using the fingerprint sensor.

In an aspect, there is provided a comparison method of authenticating a user using an electronic device comprising a fingerprint sensor. The method comprises: obtaining second fingerprint data of a subsequent hand using the fingerprint sensor; determining features of second fingerprints of respective fingers of the subsequent hand; determining a degree of similarity between each one of a plurality of stored first fingerprints from a first hand and each one of the second fingerprints based on a comparison of respective features of the first and second fingerprints; identifying pairs of fingerprints, each pair comprising one of the stored first fingerprints and the second fingerprint which has the highest degree of similarity to said one of the stored first fingerprints; determining a plausibility of the displacement of each pair relative to each of the other pairs based on a stored indication of plausible displacement between possible pairs of the first fingerprints; and controlling authentication of the user based on the determined plausibility of the displacement of each pair of fingerprints.

In an aspect, there is provided an electronic device comprising a fingerprint sensor, which is capable of simultaneously acquiring a plurality of fingerprints of a hand, memory means and processing means, which are configured to implement any of the methods disclosed herein.

In an aspect, there is provided a computer program product, which is loadable in the memory means of an electronic device comprising processing means and is designed to implement, when executed by said processing means, any of the methods disclosed herein.

Aspects of the present disclosure are directed to methods to authenticate a user in an electronic device comprising a fingerprint sensor, as well as to enrollment methods of preparing an electronic device comprising a fingerprint sensor to authenticate a user using the fingerprint sensor, and to comparison methods of authenticating a user using an electronic device comprising a fingerprint sensor. Aspects are also directed to an electronic device comprising a fingerprint sensor capable of simultaneously acquiring a plurality of fingerprints of a hand, memory means, and processing means, which are configured to implement any of the methods disclosed herein. Exemplary electronic devices may comprise sensor arrays comprising a plurality of touch sensitive pixels.

For example, in an aspect there is provided a sensor array comprising a plurality of touch sensitive pixels, each pixel comprising: a capacitive sensing electrode for accumulating a charge in response to proximity of a conductive object to be sensed; a reference capacitor connected in series with the capacitive sensing electrode so that, in response to a control voltage, an indicator voltage is provided at the connection between the reference capacitor and the capacitive sensing electrode to indicate the proximity of the conductive object to be sensed. This arrangement may reduce or overcome the problem associated with parasitic capacitance which may occur in prior art touch sensors.

Each pixel may comprise a sense VCI (voltage-controlled impedance) having a control terminal connected so that the impedance of the sense VCI is controlled by the indicator voltage. Typically, the sense VCI comprises at least one TFT (thin film transistor) and the conduction path of the VCI comprises the channel of the TFT. A conduction path of the sense VCI may be connected to a first plate of the reference capacitor, and the control terminal of the first VCI is connected to the second plate of the reference capacitor. At least one plate of the reference capacitor may be provided by a metallisation layer of a thin film structure which provides the sense VCI.

The conduction path of the sense VCI may connect the first plate of the reference capacitor, and so also the control voltage, to an input of a readout circuit. This may enable the circuitry which provides the control voltage also to provide the basis for the output signal of the pixel. This may further address problems associated with parasitic capacitance and signal to noise ratio in prior art touch sensors. An alternative way to address this same problem is to arrange the conduction path of the sense VCI to connect a reference signal supply to an input of a readout circuit. The reference signal supply may comprise a constant voltage current source. Thus, modulating the impedance of the sense VCI of a pixel controls the current from that pixel to the input of the read-out circuit.

A select VCI may also be included in each pixel. This may be connected so that its conduction path is connected in series between the conduction path of the sense VCI and the reference signal supply. Thus, switching the select VCI into a non-conducting state can isolate the sense VCI from the reference signal input, whereas switching the select VCI into a conducting state can enable current to flow through the pixel (depending on the impedance of the sense VCI). A control terminal of the select VCI may be connected for receiving the control voltage, e.g. from agate drive circuit.

Each pixel may comprise a gate line VCI, and a conduction path of the gate line VCI may connect the reference signal supply to the first plate of the reference capacitor for providing the control voltage.

Each pixel may comprise a reset circuit for setting the control terminal of the sense VCI to a selected reset voltage. The reset circuit may comprise a reset VCI. A conduction path of the reset VCI is connected between a second plate of the reference capacitor and one of (a) a reset voltage; and (b) a first plate of the reference capacitor. A control terminal of the reset VCI may be connected to another pixel of the sensor for receiving a reset signal (e.g. from a channel of a gate drive circuit which is connected to the control terminal of the select VCI of a pixel in another row of the array). The reset signal may be configured to switch the reset VCI into a conducting state, thereby to connect the second plate of the reference capacitor to the one of (a) the reset voltage and (b) the first plate of the capacitor. Connecting the second plate of the reference capacitor to the one of (a) the reset voltage.

The present disclosure will now be described with reference to the accompanying drawings, wherein.

Figure 9:
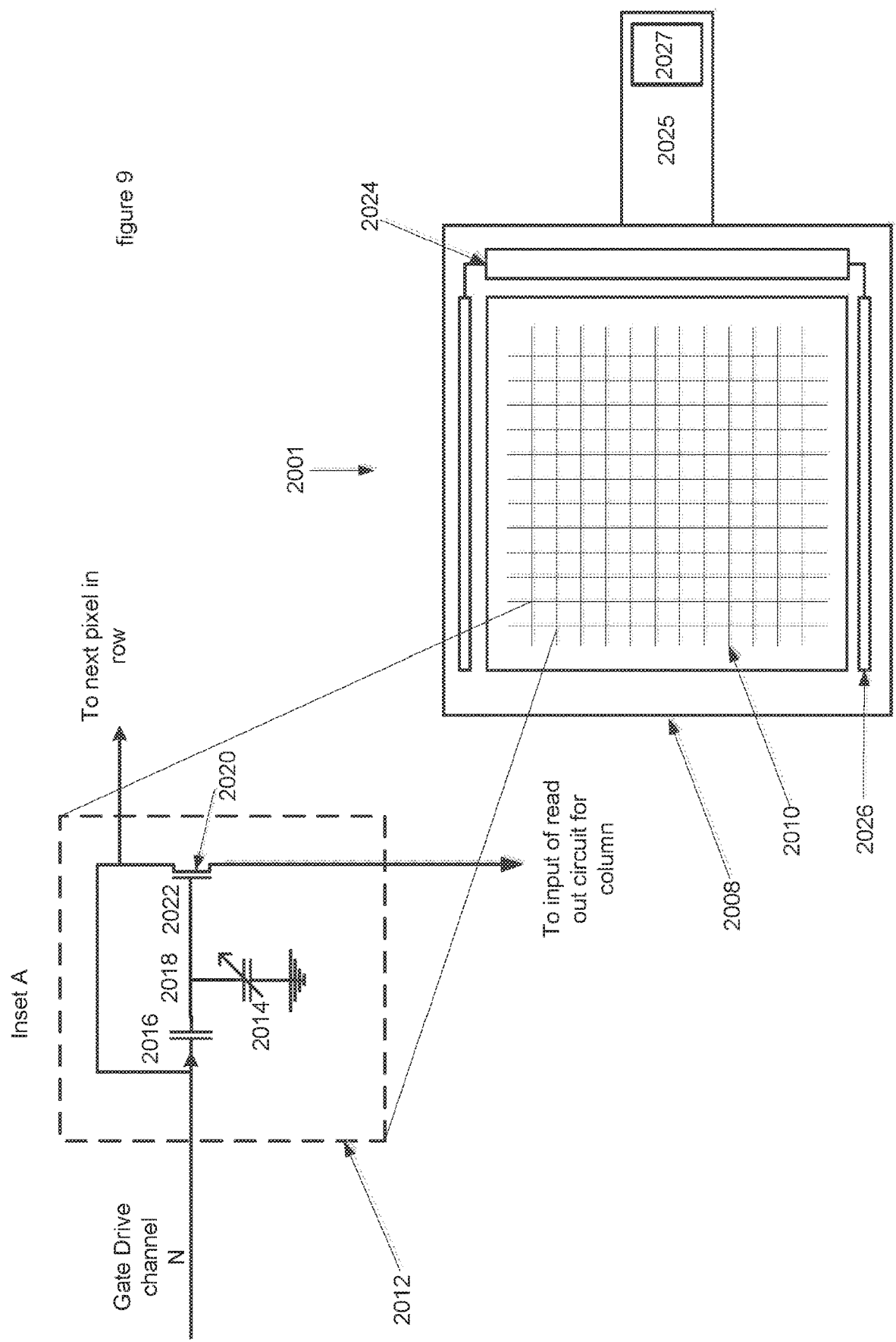
Figure 10:
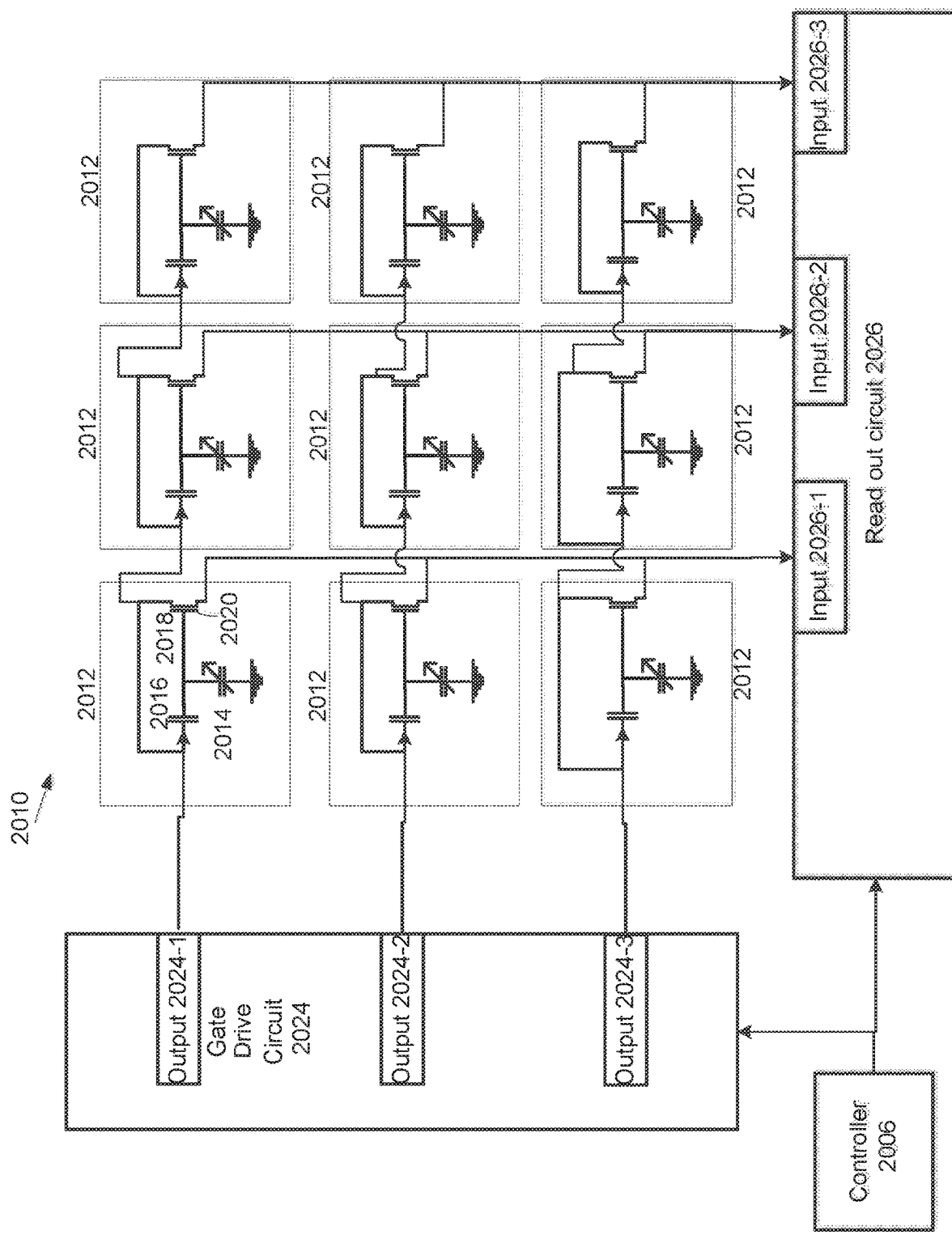
Figure 11:
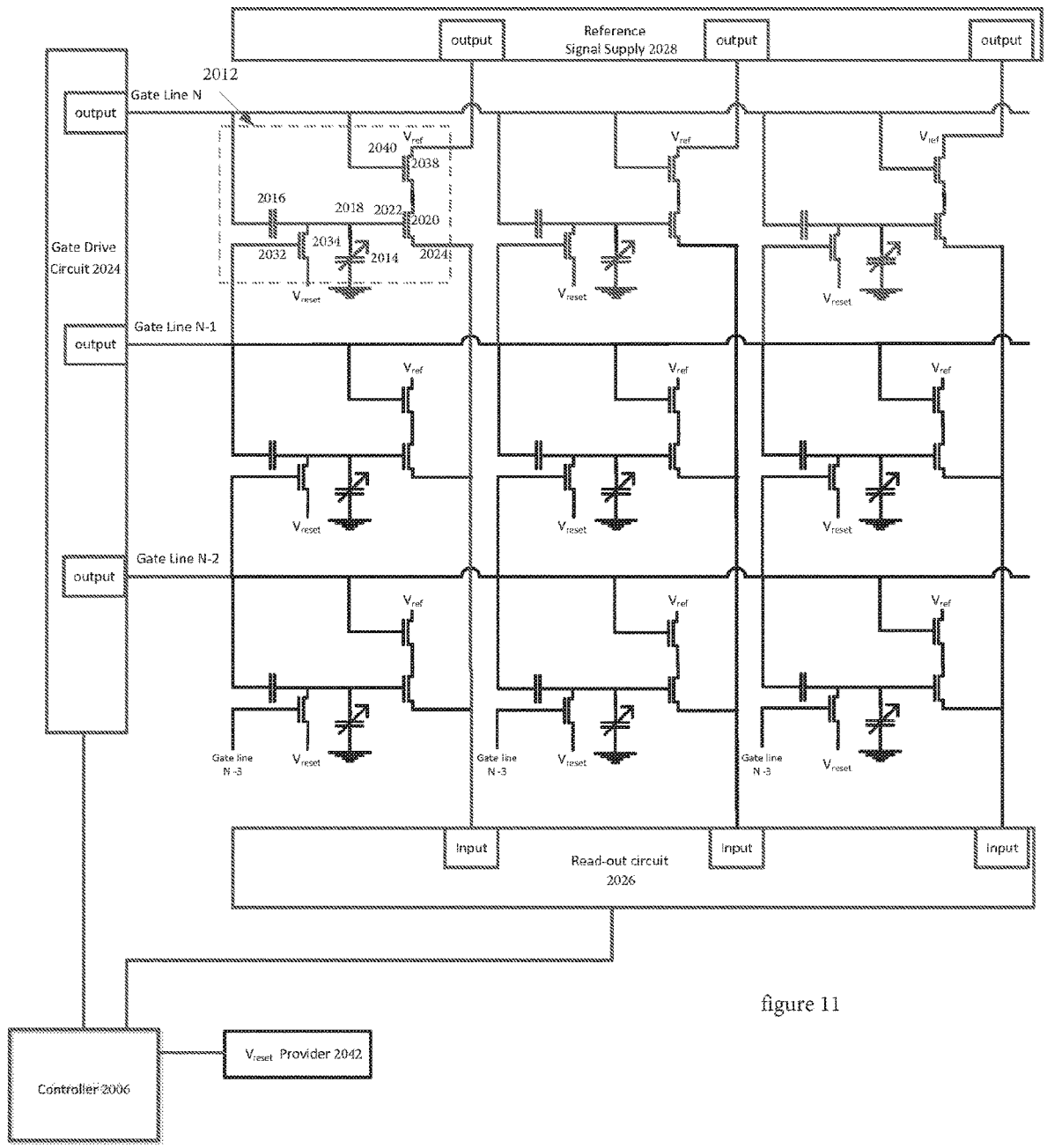
Figure 12:
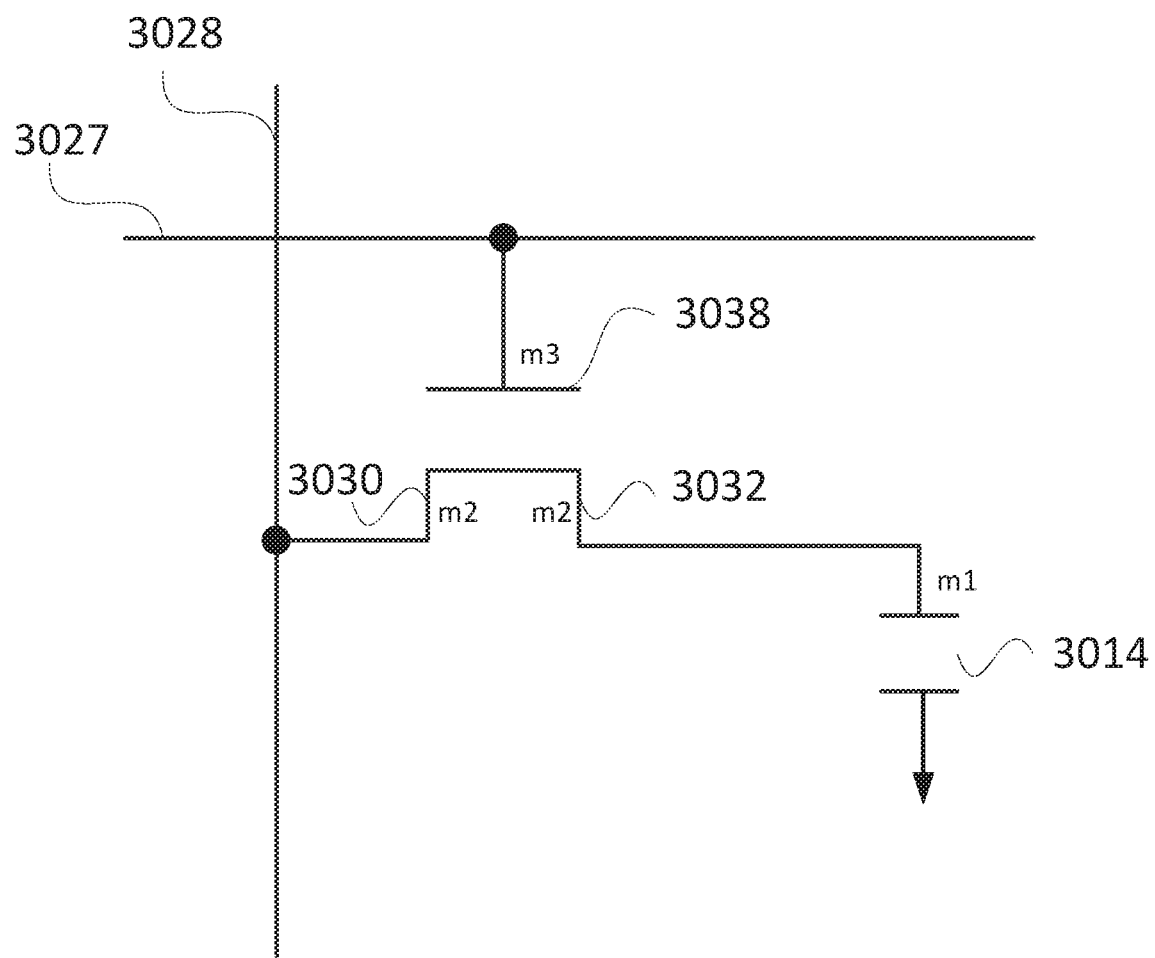

FIG. 9 comprises a plan view of a sensor apparatus comprising a sensor array, and Inset A of FIG. 9 shows a circuit diagram for a pixel of the sensor array;

FIG. 10 shows a circuit diagram of a sensor array for a sensor apparatus such as that illustrated in FIG. 9;

FIG. 11 shows a circuit diagram of another sensor array of the type shown in FIG. 9;

FIG. 12 is a schematic diagram of a pixel circuit diagram of a top gate structure of a pixel in a pixel array.

Figure 1:
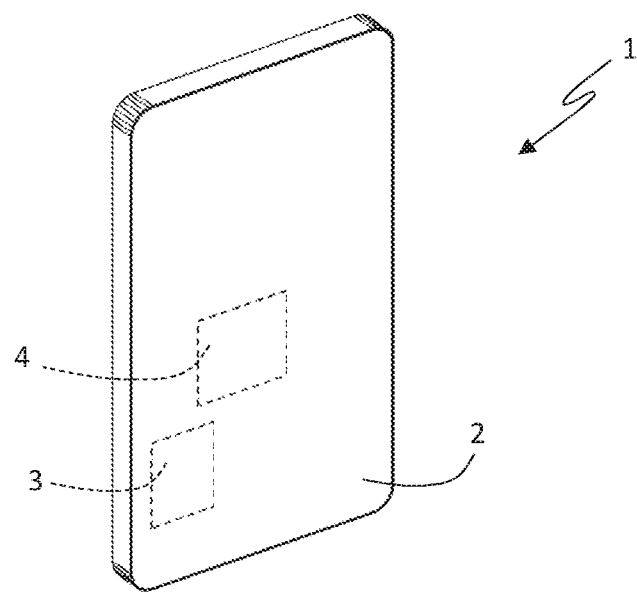
FIG. 1 shows an electronic device provided with a fingerprint sensor.

In FIG. 1, number 1 generally indicates, as a whole, an electronic device, for example a smartphone, comprising a touchscreen 2, which is provided with a built-in fingerprint sensor (which is not shown), at least one memory 3 and a processing unit 4, which is interfaced with the touchscreen 2 and the memory 3. The fingerprint sensor is built-in in at least part of the area of the touchscreen 2 so as to simultaneously acquire a plurality of fingerprints of a hand without impacting the normal operation of the touchscreen 2.

Figure 2:
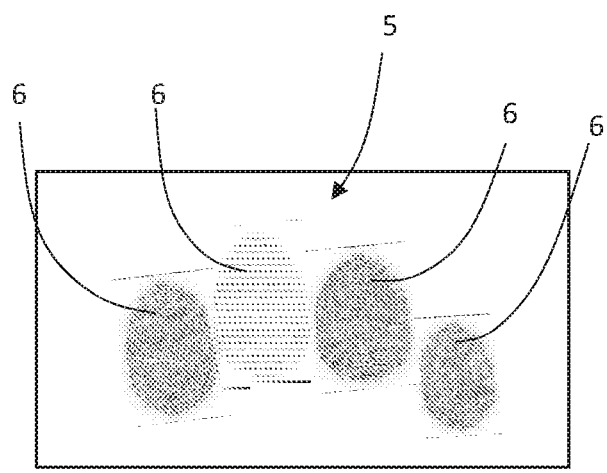
FIG. 2 shows an example of a fingerprint image acquired by the electronic device of FIG. 1.

In FIG. 2, number 5 indicates a fingerprint image of a hand of a user acquired by means of the fingerprint sensor built-in in the touchscreen 2. The fingerprint image 5 comprises four fingerprints 6 belonging to respective fingers of the hand, namely all fingers except the thumb. The fingerprint image 5 is acquired when the user grabs the smartphone 1 laying the fingers, except the thumb, on the touchscreen 2.

The processing unit 4 is configured to implement the user authentication method according to the invention. In particular, a computer program product is loaded in the memory 3 and is designed to implement, when it is executed by the processing unit 4, the user authentication method according to the invention, said method being described hereinafter with particular reference to FIGS. 3-5

Figure 3:
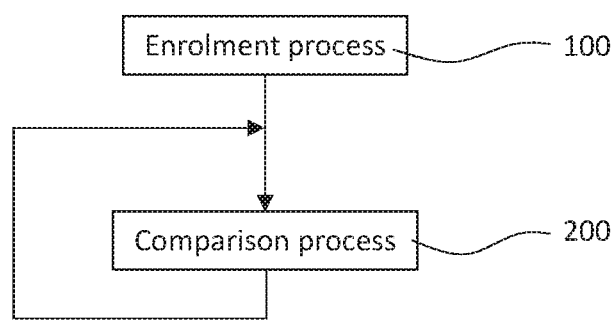
FIG. 3 shows a general flowchart of the method to authenticate a user in the electronic device of FIG. 1 according to the invention.

With reference to FIG. 3, the method to authenticate a user in the electronic device 1 comprises, in general, an enrollment process (step 100), which is typically carried out only once when the electronic device 1 is used for the first time, and a comparison process (step 200), which is typically carried out each time the user wants to use the electronic device 1, for example to unlock the touchscreen 2.

Figure 4:
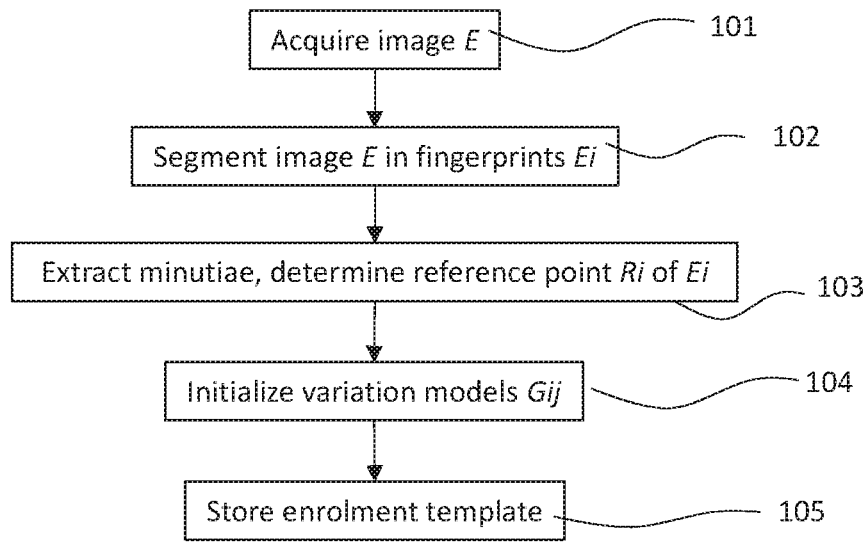
FIG. 4 shows, more in detail, a part of the flowchart of FIG. 3 concerning a fingerprint enrollment process which is part of the user authentication method according to the invention.

With reference to FIG. 4, the enrollment process involves acquiring a first fingerprint image of a hand, like the one shown in FIG. 2 and indicated hereinafter with E, by means of the fingerprint sensor (step 101) and processing the fingerprint image E in order to determine features of first fingerprints, hereinafter generically indicated with Ei (i≤5), belonging to respective fingers of the hand.

In particular, the fingerprint image E is processed and, in particular, segmented according to known techniques in order to isolate the single fingerprints Ei (step 102) and, then, each fingerprint Ei is processed so as to extract its minutiae, namely ending and bifurcations of the ridges characterizing the fingerprints, and a respective reference point Ri is determined based on the minutiae (step 103). Therefore, the features of a fingerprint Ei comprise the respective minutiae and reference point Ri.

Both the minutiae and the respective reference point Ri are identified relative to a coordinate system on a surface along which the fingerprint image E develops. In the example of FIGS. 1 and 2, the surface of the fingerprint image is a plane.

The reference point Ri advantageously consists of the geometric centre of mass of the minutia of the fingerprint Ei.

Furthermore, for each one of the possible pairs of first fingerprints, hereinafter indicated with <Ei,Ej> (i≤5; j≤5; i<j), a respective variation model Gij indicating a plausible variation of the mutual position of the two fingerprints Ei and Ej is initialized based on the respective features (step 104). In particular, the variation model Gij is defined by a bivariate Gaussian function having a mean vector µij calculated as a function of the features of the corresponding pair of fingerprints <Ei,Ej> and a covariance matrix Σij. The mean vector µij is initialized to an initial displacement vector D0ij, which is calculated as a difference vector between the reference points Ri and Rj of the pair of fingerprints <Ei,Ej>, namely:

$$D0ij = Rj - Ri \quad (1)$$

and the covariance matrix Σij is initialized to a scalar diagonal matrix, i.e. a matrix with values along the diagonal that are equal to an initial value Σ0 representing an initial position tolerance.

The minutiae and the reference points Ri of all fingerprints Ei as well as the variation models Σij of the possible pairs of fingerprints <Ei,Ej> are stored in an enrollment template in the memory 3 for the execution of the following comparison process (step 105).

Figure 5:
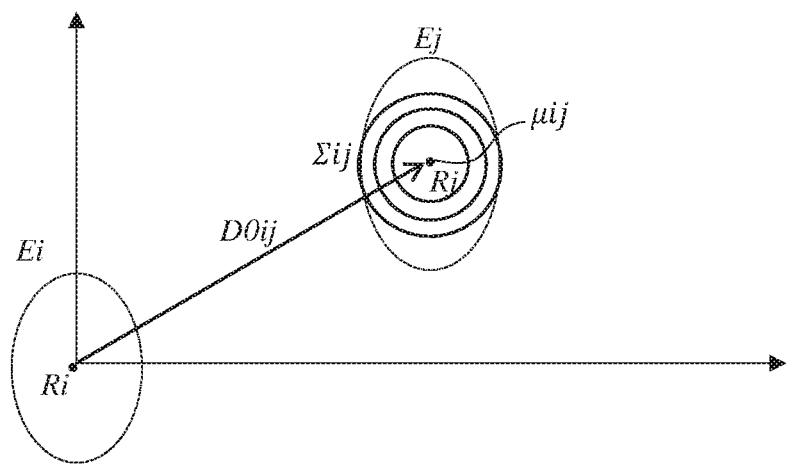
FIG. 5 is a graphic representation of a mathematical model created during the enrollment process.

FIG. 5 is a graphic representation of the variation model Gij relative to a Cartesian coordinate system at the end of the enrollment process. The ellipses drawn with a dashed line represent the areas of two fingerprints Ei and Ej, whose respective reference points Ri and Rj are the ends of the initial displacement vector D0ij, and the circles drawn with a continuous line represent the iso-probability contours of the variation model Gij, which is defined by a bivariate Gaussian function centred on the mean value µij and having a spherical symmetry defined by the covariance matrix Σij.

Figure 6:
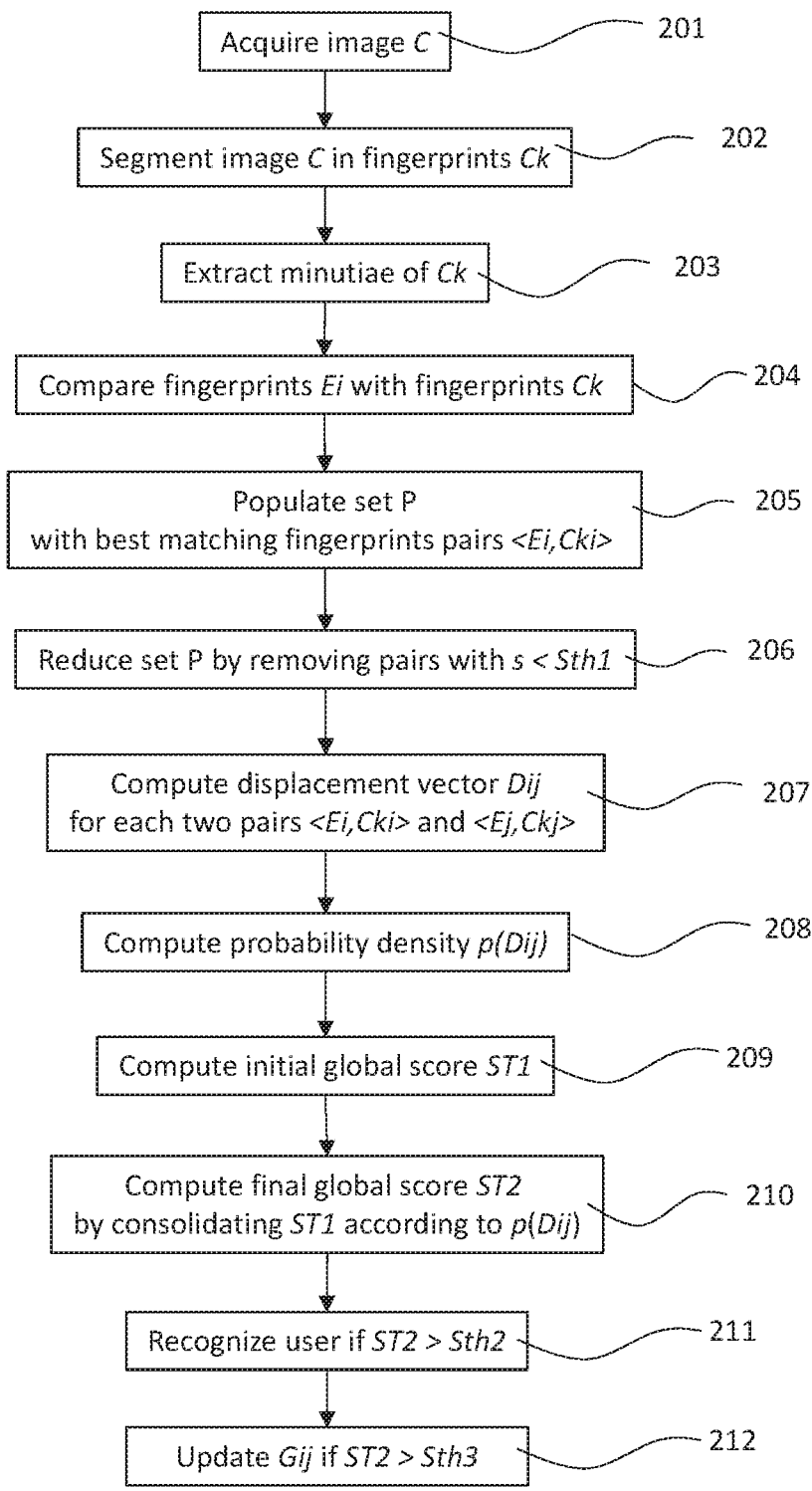
FIG. 6 shows, more in detail, a part of the flowchart of FIG. 3 concerning a fingerprint comparison process which is part of the user authentication method according to the invention.

With reference to FIG. 6, the comparison process, similarly to the enrollment process, involves acquiring a successive fingerprint image of a hand, like the one shown in FIG. 2 and indicated hereinafter with C, by means of the fingerprint sensor (step 201) and processing the fingerprint image C in order to determine features of successive fingerprints, hereinafter generically indicated with Ck (k≤5), belonging to respective fingers of the hand. The features considered for the fingerprints Ck are its minutiae.

The fingerprint image C is processed and, in particular, segmented according to known techniques so as to isolate the single fingerprints Ck (step 202) and, then, each fingerprint Ck is processed to extract its minutiae (203). The minutiae of the fingerprints Ck are identified relative to the same coordinate system used to identify the minutiae of the fingerprints Ei.

At this point, a degree of similarity is determined between each one of the fingerprints Ei and each one of the fingerprints Ck based on a comparison of the respective features (204). In particular, the minutiae of each fingerprint Ei are compared with the minutiae of each one of the fingerprints Ck, using known comparison techniques, in order to determine, for each comparison and, hence, for each pair of fingerprints <Ei,Ck>, a respective confidence score S and a respective rototranslation. The confidence score S is, for example, proportional to the number of coincident minutiae in the two fingerprints Ei and Ck. The rototranslation consists of a rotation angle θ and of a translation vector T, which maximize the number of matchings between minutiae of the two fingerprints Ei and Ck. In other words, the degree of similarity of a pair of fingerprints <Ei,Ck> is defined by the respective confidence score S and by the respective rototranslation, hereinafter synthetically indicated with (θi, Ti).

A set P of pairs of fingerprints is populated by selecting, for each fingerprint Ei, the fingerprint Cki offering the highest degree of similarity and, in particular, the highest confidence score S (step 205). Hereafter, ki must be intended as a single index which spans the set of fingerprints C and is in correspondence with the index i spanning the set of fingerprints E.

Therefore, the set P can be represented as follows:

$$P = \{<Ei,Cki>\}; i \leq 5; ki \leq 5.$$

Owing to the above, each pair <Ei,Cki> of the set P is associated with a respective confidence score S and with a respective rototranslation (θi,Ti).

The set P is advantageously reduced by removing those pairs of fingerprints <Ei,Cki> whose confidence score S is smaller than a threshold value Sth1 (step 206). In other words, the set P comprises pairs of fingerprints <Ei,Cki> whose confidence score S is greater than or equal to the threshold value Sth1. The threshold value Sth1 is chosen based on the desired degree of safety of the authentication method and on the type of algorithm used for the comparison.

The comparison process goes on by determining a degree of plausibility of the mutual position of each pair of fingerprints <Ei,Cki> relative to every other pair of fingerprints <Ej,Ckj> of the set P, so that j>i, based on the features of the fingerprints Ei, Cki, Ej and Ckj of the two pairs of fingerprints <Ei,Cki> and <Ej,Ckj> and based on the variation model Gij concerning the fingerprints Ei and Ej and the aforesaid two pairs of fingerprints.

In particular, a displacement vector Dij of each pair <Ei,Cki> relative to every other pair <Ej,Ckj> of the set P is computed based on the reference points Ri and Rj of the fingerprints Ei and Ej of the two pairs <Ei,Cki> and <Ej,Ckj> and based on the rototranslations (θi,Ti) and (θj,Tj) of the two pairs <Ei,Cki> and <Ej,Ckj>, namely based on the rototranslation (θi,Ti) between the fingerprints Ei and Cki and the rototranslation (θj,Tj) between the fingerprints Ej and Ckj (step 207).

To this aim, the respective rototranslations (θi,Ti) and (θj,Tj) are applied to the reference points Ri and Rj of the fingerprints Ei and Ej of the two pairs <Ei,Cki> and <Ej,Ckj> in order to obtain two respective new reference points, hereinafter indicated with Ri' and Rj'. The displacement vector Dij is computed as rotation of a difference vector between the two new reference points Ri' and Rj', this rotation being equal to an average θavg of the rotation angles θi and θj of the rototranslations (θi,Ti) and (θj,Tj). More synthetically, the displacement vector Dij is obtained from a function of the following type:

$$Dij = \text{rotate}(Rj' - Ri', \theta avg). \quad (2)$$

Figure 7:
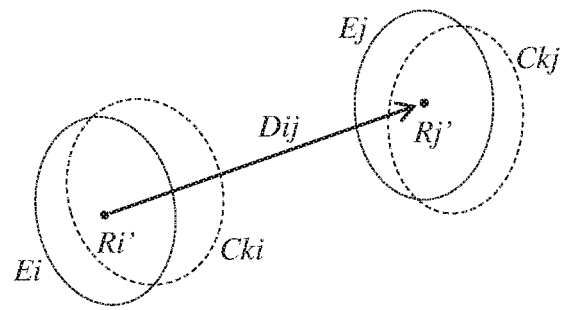
FIG. 7 shows a graphic representation concerning a step of the comparison process of FIG. 6.

FIG. 7 is a graphic representation of an example of two fingerprints Ei and Ej mapped on the corresponding fingerprints Cki and Ckj, showing the position of the new reference points Ri' and Rj'. The fingerprints Ei and Ej and the corresponding fingerprints Cki and Ckj only partially overlap because the fingerprint portions of the same fingers captured in different acquisitions are not necessarily the same. In other words, the displacement vector Dij cannot be calculated starting from possible reference points of the fingerprints Cki and Ckj, because these points would not necessarily correspond to the original reference points of the fingerprints Ei and Ej of the same fingers. Indeed, since the reference points are calculated based on the visible minutiae of the fingerprint image, the position of the minutiae in the image depends on the fingerprint portions that come into contact with the touchscreen 2. Furthermore, the displacement vector Dij must be rotated to the coordinates of the initial displacement vector D0$ij$, where the variation model Gij is defined.

At this point, a probability density of observing the displacement vector Dij, hereinafter indicated with p(Dij), is computed based on the variation model Gij concerning the fingerprints Ei and Ej of the two pairs <Ei,Cki> and <Ej,Ckj> (step 208). In particular, the probability density p(Dij) is computed taking into account a probability density with a bivariate Gaussian distribution, which has a mean vector and a covariance matrix coinciding with the mean vector μij and with the covariance matrix Σij, respectively, of the variation model Gij concerning the fingerprints Ei and Ej of the two pairs <Ei,Cki> and <Ej,Ckj>, namely with the formula:

$$p(Dij) = \frac{1}{2\pi |\Sigma ij|^{1/2}} e^{-\frac{(Dij-\mu ij)^t \Sigma_{ij}^{-1}(Dij-\mu ij)}{2}} \quad (3)$$

wherein |Σij| and Σij$^{-1}$ are the determinant and the inverse matrix, respectively, of the covariance matrix Σij. Therefore, the degree of plausibility of the mutual position of each pair <Ei,Cki> relative to every other pair <Ej,Ckj> of the set P is defined by the probability density p(Dij).

The user recognition takes place based on the degrees of similarity between the fingerprints Ei and the fingerprints Cki and based on the degrees of plausibility of the mutual position of the pairs <Ei,Cki> and <Ej,Ckj> of the set P.

In particular, an initial global score ST1 is computed by summing the confidence scores S associated with the pairs <Ei,Cki> and <Ej,Ckj> of the set P (step 209). A final global score ST2 is computed by consolidating the initial global score ST1 according to the probability densities p(Dij) of the displacement vectors Dij between the pairs <Ei,Cki> and <Ej,Ckj> of the set P (step 210). The two fingerprint images E and C are assumed to belong to the same user and, hence, the user is recognized, if the final global score ST2 is greater than a second threshold value Sth2 (step 211). The threshold value Sth2 is chosen based on the desired degree of safety of the authentication method.

The consolidation of the initial global score ST1 takes place through a function of the probability density p(Dij), which depends on the particular electronic device 1, namely on the specific field of use thereof. Generally speaking, if the degrees of plausibility of the mutual position of the pairs of fingerprints of the set Pare high, then the global score is increased, namely the final global score ST2 becomes higher than the initial global score ST1, vice versa if the mutual position plausibility degrees are low. In other words, if the mutual positions of the fingerprints Ck are consistent relative to the variation models Gij, then the global score needs to be increased proportionally to the consistency level.

According to a further embodiment of the invention which is not shown herein, the first global score ST1 is calculated immediately after the final formation of the set P, namely after step 206 of FIG. 5.

Finally, all variation models Gij are updated based on the degrees of similarity and on the mutual position plausibility degrees. In particular, the variation models Gij are updated if the global score ST2 exceeds a third threshold value Sth3 (step 212). The threshold value Sth3 is chosen based on the desired degree of safety of the authentication method, as well.

In particular, for each variation model Gij concerning the fingerprints Ei and Ej, the respective mean vector μij and the respective covariance matrix Σij are updated according to the displacement vector Dij of those pairs <Ei,Cki> and <Ej,Ckj> of the set P comprising the fingerprints Ei and Ej.

For example, the displacement vectors Dij of a given number of last successive fingerprint images C are stored in the memory 3: the mean vector μij is recomputed as average of said number of last displacement vectors Dij and the covariance matrix Σij is recomputed based on said number of last displacement vectors Dij and on the mean vector μij according to known formulas. According to an alternative example, the mean vector μij and the covariance matrix Σij are recomputed with known incremental formulas based on the displacement vector Dij of the last fingerprint image C acquired.

Figure 8:
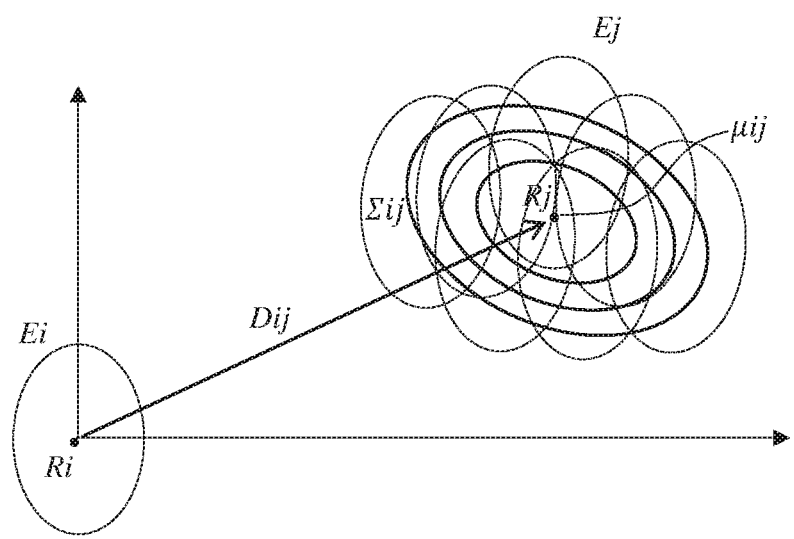
FIG. 8 is a graphic representation similar to the one of FIG. 5, but here the mathematical model is updated after a plurality of executions of the comparison process.

FIG. 8 is an example graphic representation, similar to the one of FIG. 5, of the variation model Gij updated after a plurality of executions of the comparison process concerning the acquisition of a plurality of successive fingerprint images C and, hence, of a plurality of successive fingerprints. The ellipses drawn with a dashed lines and indicated with Ej are the areas of fingerprints of the same finger after a plurality of updates. The variation model Gij of the example shown herein has iso-probability contours shaped like ellipses, which means that it is updated to tolerate great displacements along a direction that is transversal to the longitudinal axes of the outlines of the fingerprints.

Even though the invention described above relates to a specific embodiment, it should not be considered as limited to said embodiment, for its scope of protection also includes all those variants, changes or simplifications covered by the appended claims, such as for example:

using a probability model other than the Gaussian to determine the degree of plausibility, for example the use of a mixture of Gaussian would enable to learn touch modalities which can be quite different each from the other;

using features other than the minutiae and, hence, different comparison techniques to determine the degree of similarity between the fingerprints Ei and Ck, for example the patch correlation technique.

Moreover, the user authentication method according to the invention is applicable also to electronic devices having a fingerprint sensor embedded in a support which is not planar as a conventional touchscreen, such as a door handle of a vehicle or room or the helve of a weapon, so that the user can be authenticated before to open the door or use the weapon.

The main advantage of the user authentication method according to the invention is that of recognizing the user not only based on the features extracted from the fingerprints acquired by the fingerprint sensor, but also based on finger anatomic information implicitly obtained from the mutual position of the different fingerprints of a hand, thanks to the variation model determined in an enrollment process and to the degree of plausibility of the mutual position of the fingerprints determined based on the variation model during a following comparison process. Indeed, even if the mutual positions of the fingerprints of the fingers of a hand can change in successive acquisitions of fingerprint images, due to the different ways in which the user grabs the electronic device 1 and touches the touch screen 2, the anatomy of the hand limits the degree of freedom of the movements of the fingers and, hence, the variability of the mutual position of the fingers.

It is to be appreciated in the context of the present disclosure that while reference may have been made to a sensor which can simultaneously obtain fingerprint data for multiple fingerprints, this is not necessary. The systems and methods provide means for processing multiple fingerprint data, but these are not limited to specific temporal circumstances (e.g. the time at which the fingerprint data was obtained). For example, embodiments may find equal utility for sensors where fingerprint data has been obtained sequentially for each fingerprint.

It is to be appreciated in the context of the present disclosure that while reference has been made to memory means of the electronic device, this memory may be provided by a component external to the electronic device. For example, the memory may be cloud based. The electronic device may communicate with a third party component which stores relevant data. This communication may be wired or wireless.

It is to be appreciated in the context of the present disclosure that while reference has been made to a variation model (Gij), explicit use of any such model is not necessary. The variation model may provide an indication of an expected position of each of a user's fingerprints (e.g. including an orientation) and/or an expected displacement between each of a user's fingerprints. Based on the expected position/displacement of a user's fingerprints, it may be determined whether their fingerprints correspond to those of the authenticated user. It will therefore be appreciated that use of a specific model is not explicitly required to perform this function.

For example, data may be stored which indicates expected bounds for position/displacement of fingerprints. Any sensed fingerprint data outside these bounds may be deemed to not belong to the user. As another example, data may be stored which corresponds to (e.g. is) data obtained from the verified user. A comparison may then be performed between subsequently obtained data and this stored data to determine whether the subsequently obtained data also corresponds to data for the authenticated user. This comparison may be performed without initializing (and also storing) a variation model. Authentication determinations may be performed on-the-fly based on stored data, without the need for a variation model.

It is to be appreciated in the context of the present disclosure that while reference has been made to populating a set of pairs, this may not be necessary. Each fingerprint from the first hand may be associated with a fingerprint from the successive hand. Calculations may be performed using these two fingerprints and comparisons between them and other fingerprint combinations between first and successive hands. Pairs need not be populated to perform this desired functionality. For example, calculations may be made on-the-fly It is to be appreciated in the context of the present disclosure that while methods described herein include both an enrollment process and a comparison process, these may be performed separately, e.g. each may be performed without the other. For example, the comparison process may be performed, and achieve desired technical effects, using stored data. The stored data could have been obtained using an enrollment process as described herein, or it could have been obtained in another manner, such as from another source of fingerprint data. Likewise, the enrollment process may occur without the ensuing comparison process. This may still enable a technical effect of enabling identification of a user based on mutual location of their fingerprints.

It is to be appreciated in the context of the present disclosure that while methods described herein include updating variation models based on degrees of similarity and degrees of plausibility of the mutual position, it is to be appreciated that this is not necessary. Embodiments may still enable a user to be identified based on a mutual position of their fingerprints without updating variation models. Once the variation model has been initialized, the methods may still function to provide desired technical effects without updating the variation model. It is also to be appreciated that determining the degree of plausibility of the mutual position of each pair may occur without being based on the specific features of each fingertip. For example, a relative position may still be sensed without knowledge of the feature of the fingertip. Recognizing the user may not need to be based on both the degree of similarity between fingerprints and degrees of plausibility of mutual position. It may just be based on degrees of plausibility of mutual position. This may still enable a user to be identified based on the relative displacement between their fingerprints. Likewise, it is to be appreciated that a mutual position of each successive fingertip is not required. The user may be identified (e.g. as the authenticated user, or not the authenticated user) based on mutual position of first fingerprints alone.

Methods of the present disclosure may be implemented by any suitable electronic device comprising a fingerprint sensor. It is to be appreciated in the context of the present disclosure that any such suitable electronic device may be provided. Such electronic devices may comprise a sensor apparatus. Such a sensor apparatus may comprise a plurality of touch sensitive pixels. Exemplary sensor apparatuses and pixels shall now be described which may be configured to provide the functionality of the methods disclosed herein.

FIG. 9 shows a sensor apparatus 2001 in which the sensor array 2010 of the present disclosure may be incorporated. FIG. 10 illustrates a circuit diagram of one such sensor array 2010. The description which follows shall refer to FIG. 9 and FIG. 10 together. It can be seen from an inspection of FIG. 9 and FIG. 10 that inset A of FIG. 9 shows a detailed view of one pixel of this array 2010.

The sensor array 2010 comprises a plurality of touch sensitive pixels 2012. Typically, other than in respect of its position in the array, each pixel 2012 is identical to the others in the array 2010. As illustrated, each pixel 2012 comprises a capacitive sensing electrode 2014 for accumulating a charge in response to proximity of the surface of a conductive object to be sensed. A reference capacitor 2016 is connected between the capacitive sensing electrode 2014 and a connection to a gate drive channel 2024-1 of a gate drive circuit 2024. Thus, a first plate of the reference capacitor 2016 is connected to the gate drive channel 2024-1, and a second plate of the reference capacitor 2016 is connected to the capacitive sensing electrode 2014.

Each pixel 2012 may also comprise a sense VCI (voltage-controlled impedance) 2020 having a conduction path, and a control terminal (2022; inset A, FIG. 9) for controlling the impedance of the conduction path. The conduction path of the sense VCI 2020 may connect the gate drive channel 2024-1 to an output of the pixel 2012. The control terminal 2022 of the VCI is connected to the capacitive sensing electrode 2014 and to the second plate of the reference capacitor 2016. Thus, in response to a control voltage applied by the gate drive channel 2024-1, the reference capacitor 2016 and the capacitive sensing electrode 2014 act as a capacitive potential divider.

The capacitance of the capacitive sensing electrode 2014 depends on the proximity, to the capacitive sensing electrode 2014, of a conductive surface of an object to be sensed. Thus, when a control voltage is applied to the first plate of the reference capacitor 2016, the relative division of that voltage between that sensing electrode 2014 and the reference capacitor 2016 provides an indication of the proximity of the surface of that conductive object to the capacitive sensing electrode 2014. This division of the control voltage provides an indicator voltage at the connection 2018 between the reference capacitor 2016 and the capacitive sensing electrode 2014. This indicator voltage can be applied to the control terminal 2022 of the sense VCI 2020 to provide an output from the pixel 2012 which indicates proximity of the conductive object.

Pixels may be positioned sufficiently close together so as to be able to resolve contours of the skin such as those associated with epidermal ridges, for example those present in a fingerprint, palmprint or other identifying surface of the body. It will be appreciated in the context of the present disclosure that contours of the skin may comprise ridges, and valleys between those ridges. During touch sensing, the ridges may be relatively closer to a sensing electrode than the "valleys" between those ridges. Accordingly, the capacitance of a sensing electrode adjacent a ridge will be higher than that of a sensing electrode which is adjacent a valley. The description which follows explains how systems can be provided in which sensors of sufficiently high resolution to perform fingerprint and other biometric touch sensing may be provided over larger areas than has previously been possible.

As shown in FIG. 9 and FIG. 10 in addition to the sensor array 2010, such a sensor may also comprise a dielectric shield 2008, agate drive circuit 2024, and a read-out circuit 2026. A connector 2025 for connection to a host device may also be included. This may be provided by a multi-channel connector having a plurality of conductive lines. This may be flexible, and may comprise a connector such as a flexi, or flexi-rigid PCB, a ribbon cable or similar. The connector 2025 may carry a host interface 2027, such as a plug or socket, for connecting the conductive lines in the connector to signal channels of a host device in which the sensor apparatus 2001 is to be included.

The host interface 2027 is connected by the connector 2025 to the read-out circuit 2026. A controller (2006; FIG. 10) may be connected to the gate drive circuit 2024 for operating the sensor array, and to the read-out circuit 2026 for obtaining signals indicative of the self-capacitance of pixels of the sensor array 2010.

The dielectric shield 2008 is generally in the form of a sheet of an insulating material which may be transparent and flexible such as a polymer or glass. The dielectric shield 2008 may be flexible, and may be curved. An 'active area' of this shield overlies the sensor array 2010. In some embodiments, the VCIs and other pixel components are carried on a separate substrate, and the shield 2008 overlies these components on their substrate. In other embodiments the shield 2008 provides the substrate for these components.

The sensor array 2010 may take any one of the variety of forms discussed herein. Different pixel designs may be used, typically however the pixels 2012 comprise at least a capacitive sensing electrode 2014, a reference capacitor 2016, and at least a sense VCI 2020.

The array illustrated in FIG. 10 comprises a plurality of rows of pixels such as those illustrated in FIG. 9. Also shown in FIG. 10 is the gate drive circuit 2024, the read out circuit 2026, and a controller 2006. The controller 2006 is configured to provide a clock signal, e.g. a periodic trigger, to the gate drive circuit 2024, and to the read-out circuit 2026.

The gate drive circuit 2024 comprises a plurality of gate drive channels 2024-1, 2024-2, 2024-3, which it is operable to control separately, e.g. independently. Each such gate drive channel 2024-1, 2024-2, 2024-3 comprises a voltage source arranged to provide a control voltage output. And each channel 2024-1 is connected to a corresponding row of pixels 2012 of the sensor array 2010. In the arrangement shown in FIG. 10 each gate drive channel 2024-1, 2024-2, 2024-3 is connected to the first plate of the reference capacitor 2016 in each pixel 2012 of its row of the sensor array 2010. During each clock cycle, the gate drive circuit 2024 is configured to activate one of the gate drive channels 2024-1, 2024-2, 2024-3 by applying a gate drive pulse to those pixels. Thus, over a series of cycles the channels (and hence the rows) are activated in sequence, and move from one step in this sequence to the next in response to the clock cycle from the controller 2006.

The read-out circuit 2026 comprises a plurality of input channels 2026-1, 2026-2, 2026-3. Each input channel 2026-1, 2026-2, 2026-3 is connected to a corresponding column of pixels 2012 in the sensor array 2010. To provide these connections, the conduction path of the sense VCI 2020 in each pixel 2012 is connected to the input channel 2026-1 for the column.

Each input channel 2026-1, 2026-2, 2026-3 of the read out circuit 2026 may comprise an analogue front end (AFE) and an analogue-to-digital converter (ADC) for obtaining a digital signal from the column connected to that input channel 2026-1. For example it may integrate the current applied to the input channel during the gate pulse to provide a measure of the current passed through the sense VCI 2020 of the active pixel 2012 in that column. The read out circuit 2026 may convert this signal to digital data using the ADC. Furthermore, the analogue front end performs impedance matching, signal filtering and other signal conditioning and may also provide a virtual reference.

In the sensor array 2010 shown in FIG. 10, the conduction channel of the sense VCI 2020 in each pixel connects the input channel of the read out circuit for that column to the gate drive channel for the pixel's row. In FIG. 10, the gate drive channel for the row thus provides a reference input. Operation of the sense VCI 2020 modulates this reference input to provide the pixel output. This output signal from a pixel indicates the charge stored on the capacitive sensing electrode 2014 in response to that reference input relative to that stored on the reference capacitor.

FIG. 9 includes a grid as a very schematic illustration of the rows and columns of pixels 2012 which make up the array. Typically this will be a rectilinear grid, and typically the rows and columns will be evenly spaced. For example the pixels may be square. It will of course be appreciated that the grid shown in FIG. 9 is not to scale. Typically the sensor array has a pixel spacing of at least 200 dots per inch, dpi (78 dots per cm). The pixel spacing may be at least 300 dpi (118 dots per cm), for example at least 500 dpi (196 dots per cm).

Operation of the sensor array 2010 of FIG. 10 will now be described.

On each cycle of operation, the gate drive circuit 2024 and the read out circuit 2026 each receive a clock signal from the controller 2006.

In response to this clock signal, the gate drive circuit operates one of the gate drive channels to apply a control voltage to one of the rows of the array. In each pixel in the row, the control voltage from the gate drive channel is applied to the series connection of the reference capacitor 2016 and the capacitive sensing electrode 2014. The voltage at the connection 2018 between the two provides an indicator voltage indicating the proximity of a conductive surface of an object to be sensed to the capacitive sensing electrode 2014. This indicator voltage may be applied to the control terminal of the sense VCI 2020 to control the impedance of the conduction path of the sense VCI 2020. A current is thus provided through the conduction path of the sense VCI 2020 from the gate drive to the input channel for the pixel's column. This current is determined by the gate drive voltage, and by the impedance of the conduction channel.

In response to the same clock signal, the read-out circuit 2026 senses the pixel output signal at each input channel. This may be done by integrating the current received at each input of the read-out circuit 2026 over the time period of the gate pulse. The signal at each input channel, such as a voltage obtained by integrating the current from the corresponding column of the array, may be digitised (e.g. using an ADC). Thus, for each gate pulse, the read-out circuit 2026 obtains a set of digital signals, each signal corresponding to a column of the active row during that gate pulse. So the set of signals together represent the active row as a whole, and the output from each pixel being indicative of the charge stored on and/or the self-capacitance of the capacitive sensing electrode 2014 in that pixel.

Following this same process, each of the gate-drive channels is activated in sequence. This drives the sense VCI 2020 of each pixel connected to that channel into a conducting state for a selected time (typically the duration of one gate pulse). By activating the rows of the array in sequence the read out circuit, can scan the sensor array row-wise. Other pixel designs, other scan sequences, and other types of sensor array, may be used.

FIG. 11 illustrates another sensor array which may be used in the apparatus illustrated in FIG. 9.

FIG. 11 shows a sensor array 2010 comprising a plurality of pixels, and a reference signal supply 2028 for supplying a reference signal to the pixels. This can avoid the need for the gate drive power supply also to provide the current necessary for the read-out signal.

Also shown in FIG. 11 is the gate drive circuit 2024, the read-out circuit 2026, and the controller 2006.

The sensor array 2010 may also benefit from the inclusion of a reset circuit 2032, 2034 in each pixel. This may allow the control terminal 2022 of the pixel to be pre-charged to a selected reset voltage whilst the pixel is inactive (e.g. while another row of the array is being activated by the application of a gate pulse to another, different, row of the array).

In these embodiments the sensor may also comprise a reset voltage provider 2042 for providing a reset voltage to each of the pixels 2012 of the array as described below. The reset voltage provider 2042 may comprise voltage source circuitry, which may be configured to provide a controllable voltage, and may be connected to the controller 2006 to enable the controller 2006 to adjust and fix the reset voltage.

The reset voltage may be selected to tune the sensitivity of the pixel. In particular, the output current of the sense VCI 2020 typically has a characteristic dependence on the indicator voltage at the control terminal 2022 and its switch-on voltage. Thus the reset voltage may be chosen based on the switch-on voltage of the sense VCI 2020. The characteristic may also comprise a linear region in which it may be preferable to operate.

The pixels illustrated in FIG. 11 are similar to those illustrated in FIG. 9 and FIG. 10 in that each comprise a capacitive sensing electrode 2014, and a reference capacitor 2016 connected with a capacitive sensing electrode 2014. The connection between these two capacitances provides an indicator voltage, which can for example be connected to the control terminal 2022 of a sense VCI 2020. In addition, the pixels of the sensor array illustrated in FIG. 11 also comprise a further two VCIs 2034, 2038, and a connection to the reset voltage provider 2042, and a connection to the reference signal supply 2028.

As noted above, the sense VCI 2020 is arranged substantially as described above with reference to FIG. 9, in that its control terminal 2022 is connected to the connection between the reference capacitor 2016 and the capacitive sensing electrode 2014. However, the conduction path of the sense VCI 2020 is connected differently in FIG. 11 than in FIG. 9. In particular, the conduction channel of the select VCI 2038 connects the conduction channel of the sense VCI 2020 to the reference signal supply 2028 which provides a voltage $V_{ref}$. Thus, the conduction channel of the sense VCI 2020 is connected in series between the conduction channel of the select VCI 2038 and the input of the read-out circuit for the column. The select VCI 2038 therefore acts as a switch that, when open, connects the sense VCI 2020 between, $V_{ref}$, the reference signal supply 2028 and the input of the read-out circuit and, when closed, disconnects the sense VCI from the reference signal supply 2028. In the interests of clarity, the connection between the conduction channel of the select VCI and $V_{ref}$, the output of the reference signal supply 2028 is shown only in the top row of the array of pixels. The connection reference signal supply 2028 in the lower rows of the array is indicated in the drawing using the label $V_{ref}$.

The select VCI 2038 is therefore operable to inhibit the provision of signal from any inactive pixel to the input of the read-out circuit 2026. This can help to ensure that signal is only received from active pixels (e.g. those in the row to which the gate drive pulse is being applied).

In an embodiment each column of pixels is virtually connected to a ground or reference voltage. As such there may be no voltage differences on each of the columns thereby minimising parasitic capacitance. Furthermore, the reference signal supply may apply a current-drive rather than a voltage-drive which further reduces any effect parasitic capacitance could have on the signal applied by the active pixels on the inputs of the read-out circuit 2026.

The gate drive channel for the pixel row is connected to the first plate of the reference capacitor 2016, and to the control terminal of a select VCI 2038. As in the pixel illustrated in FIG. 9 and FIG. 10, the connection to the reference capacitor 2016 and capacitor sensing electrode 2014 means that the gate drive voltage is divided between the reference capacitor 2016 and the capacitive sensing electrode 2014 to provide the indicator voltage which controls the sense VCI 2020. The connection to the control terminal 2040 of the select VCI 2038 however means that, when the pixel is not active, the conduction path of the sense VCI 2020 is disconnected from the reference signal supply 2028.

A control terminal 2022 of the sense VCI 2020 is connected to the second plate of the reference capacitor 2016. The conduction path of the sense VCI 2020 connects the reference signal supply 2028 to the input of the read-out circuit 2026 for the pixel's column.

A conduction path of the reset VCI 2034 is connected between the second plate of the reference capacitor 2016 and a voltage output of the reset voltage provider, for receiving the reset voltage. The control terminal 2032 of the reset VCI 2034 is connected to a reset signal provider, such as the gate drive channel of another row of the sensor array. This can enable the reset VCI 2034 to discharge the reference capacitor 2016 during activation of another row of the array (e.g. a row of the array which is activated on the gate pulse prior to the pixel's row) or to pre-charge the control terminal 2022 of the sense VCI 2020 to the reset voltage.

Operation of the sensor array of FIG. 11 will now be described.

The gate drive circuit 2024 and the read-out circuit 2026 each receive a clock signal from the controller 2006. In response to this clock signal, the gate drive circuit 2024 activates a first gate drive channel of the gate drive circuit 2024 to provide agate pulse to a row of the array 2010. A control voltage is thus applied to the control terminal of the select VCI 2038 of the pixels in the first row (the active row during this gate pulse).

The control voltage is also applied to the control terminal of the reset VCI 2034 of the pixels in a second row (inactive during this gate pulse).

In the first row (the active row), the conduction channel of the select VCI 2038 is switched into a conducting state by the control voltage (e.g. that which is provided by the gate pulse). The conduction channel of the select VCI 2038 thus connects the conduction channel of the sense VCI 2020 to the reference signal supply 2028.

The control voltage is also applied to the first plate of the reference capacitor 2016. The relative division of voltage between the sensing electrode 2014 and the reference capacitor 2016 provides an indicator voltage at the connection between the reference capacitor 2016 and the capacitive sensing electrode 2014 as described above with reference to FIG. 9 and FIG. 10. The indicator voltage is applied to the control terminal 2022 of the sense VCI 2020 to control the impedance of the conduction channel of the sense VCI 2020. Thus, the sense VCI 2020 connects the reference signal supply 2028 to the input channel of the read-out circuit 2026 for that column, and presents an impedance between the two which indicates the capacitance of the capacitive sensing electrode 2014. Please note, the reference signal supply may be provided by a constant voltage current supply.

A current is thus provided through the conduction path of the sense VCI 2020 from the reference signal supply 2028 to the input channel of the read-out circuit 2026 for the pixel's column. This current is determined by the voltage of the reference signal supply and by the impedance of the conduction channel of the sense VCI.

In response to the same clock signal from the controller 2006, the read-out circuit 2026 senses the pixel output signal at each input channel (e.g. by integrating the current provided to each input channel), and digitises this signal. The integration time of the read-out circuit 2026 may match the duration of the gate pulse.

Thus, in each clock cycle, the read-out 2026 circuit obtains a set of digital signals, each signal corresponding to the signals sensed from each column of the active row during the gate pulse. The output from each pixel 2012 in the row (each channel during that gate pulse) being indicative of the charge stored on the capacitive sensing electrode in that pixel.

In the second (inactive) row the control voltage is applied to the control terminal 2032 of the reset VCI 2034. This causes the reset VCI 2034 of the pixels in the inactive row to connect the second plate of their reference capacitors 2016 to a reset voltage provided by the reset voltage provider. This may discharge (e.g. at least partially remove) charge accumulated on the pixels of the inactive row, or it may charge them to the reset voltage, before they are next activated in a subsequent gate pulse. This reset voltage may be selected to tune the sensitivity of the pixels.

At the boundaries of the pixel array, where an N−1 gate line is not available, a dummy signal may be used to provide the control signal to the reset VCI. The gate drive circuit 2024 may provide the dummy signal. This may be provided by agate drive channel which is only connected to the rest VCIs of a row at the boundary of the array, but not to any sense or select VCIs.

As illustrated in FIG. 11, the reset VCI 2034 of the pixels may be connected to the gate drive circuit so that each row is discharged in this way by the gate pulse which activates the immediately preceding row, which may be an adjacent row of the array.

In other examples, a reference capacitor need not be provided. FIG. 12 illustrates one example pixel circuit in which a reference capacitor is not provided. The circuit comprises a TFT 3030, 3032, 3038, and a capacitive sensing electrode 3014. The pixel circuit may be addressed by agate line 3027 and a source-data line 3028, and outputs to a common line, for example a Vcom connection. The TFT comprises a source region 3030, a drain region 3032 and a gate electrode 3038. The gate line 3027 is connected to the gate electrode 3038. The source region 3030 is connected to the source-data line 3028. The capacitive sensing electrode is connected to the drain region 3032, which is connected to the source region 3030, as shown in FIG. 12.

The example pixel circuit of FIG. 12 may be provided by a layered pixel structure. For example, the layered pixel structure may comprise three conductive layers m1, m2, m3. These may be metallisation layers. A first metallization layer m1 provides the capacitive sensing electrode 3014. The first metallization layer m1 may be deposited on a carrier substrate, such as a dielectric shield. A second metallisation layer, m2, provides the source 3030 and drain 3032 region of the TFT. The second layer m2 may be the type as would be provided in a top gate arrangement. A third metallisation layer, m3, provides the gate electrode 3038. In a bottom gate configuration, second and third metallisation layers may be reversed. A conductive via may be provided to provide an electrical connection between the capacitive sensing electrode 3014 and the drain region 3032 of the TFT, as can be seen in FIG. 12.

As illustrated in FIG. 12, the deposited metal layers denoted as m1, m2 and m3 adjacent the features of the circuit in FIG. 12 can be connected to form the circuit. The illustrated circuit components of the circuit diagram in FIG. 12 may depict both top gate and bottom gate arrangements. A top gate configuration is illustrated in FIG. 12, but it will be appreciated that m2 and m3 can be swapped in order to correspond to a bottom gate configuration.

In some examples, a reference capacitor could be included in the pixel circuit of FIG. 12. The reference capacitor may be connected to the drain region 3032. For example, one of the plates of the reference capacitor may be provided by the second metallisation layer. A second plate of the reference capacitor may also be provided by the third metallisation layer. The second plate of the reference capacitor may be separated from the gate electrode 3038, for example by patterning (e.g. lithography or etching) during manufacture.

It will be appreciated in the context of the present disclosure that other circuits may also be used, whereby the layers of the pixel are connected in a different manner such that a different circuit is made. The fundamental layers and the method of deposition methods would remain substantially consistent with the above disclosed embodiments. Advantages achieved by using the surface to be touched in a touch sensor also as the substrate for deposition of the pixel stack may of course be provided in other pixel circuits.

It will be appreciated from the discussion above that the examples shown in the figures are merely exemplary, and include features which may be generalised, removed or replaced as described herein and as set out in the claims. With reference to the drawings in general, it will be appreciated that schematic functional block diagrams are used to indicate functionality of systems and apparatus described herein. In addition the processing functionality may also be provided by devices which are supported by an electronic device. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some examples the function of one or more elements shown in the drawings may be integrated into a single functional unit.

As will be appreciated by the skilled reader in the context of the present disclosure, each of the examples described herein may be implemented in a variety of different ways. Any feature of any aspects of the disclosure may be combined with any of the other aspects of the disclosure. For example method aspects may be combined with apparatus aspects, and features described with reference to the operation of particular elements of apparatus may be provided in methods which do not use those particular types of apparatus. In addition, each of the features of each of the examples is intended to be separable from the features which it is described in combination with, unless it is expressly stated that some other feature is essential to its operation. Each of these separable features may of course be combined with any of the other features of the examples in which it is described, or with any of the other features or combination of features of any of the other examples described herein.

Furthermore, equivalents and modifications not described above may also be employed without departing from the invention.

Certain features of the methods described herein may be implemented in hardware, and one or more functions of the apparatus may be implemented in method steps. It will also be appreciated in the context of the present disclosure that the methods described herein need not be performed in the order in which they are described, nor necessarily in the order in which they are depicted in the drawings. Accordingly, aspects of the disclosure which are described with reference to products or apparatus are also intended to be implemented as methods and vice versa. The methods described herein may be implemented in computer programs, or in hardware or in any combination thereof. Computer programs include software, middleware, firmware, and any combination thereof. Such programs may be provided as signals or network messages and may be recorded on computer readable media such as tangible computer readable media which may store the computer programs in non-transitory form. Hardware includes computers, handheld devices, programmable processors, general purpose processors, application specific integrated circuits (ASICs), field programmable gate arrays (FPGAs), and arrays of logic gates.

Other examples and variations of the disclosure will be apparent to the skilled addressee in the context of the present disclosure.

The invention claimed is:

1. A method of authenticating a user using an electronic device comprising a fingerprint sensor, the method comprising:
   an enrolment process comprising:
      obtaining first fingerprint data of a first hand using the fingerprint sensor;
      determining, and storing, features of first fingerprints of respective fingers of the first hand; and
      determining, and storing, for each one of the possible pairs of first fingerprints, an indication of plausible displacement between the two first fingerprints on the fingerprint sensor;
   a comparison process comprising:
      obtaining second fingerprint data of a subsequent hand using the fingerprint sensor;
      determining features of second fingerprints of respective fingers of the subsequent hand;
      determining a degree of similarity between each one of the first fingerprints and each one of the second fingerprints based on a comparison of the respective features;
      identifying pairs of fingerprints, each pair comprising one of the first fingerprints and the second fingerprint which has the highest degree of similarity to said one of the first fingerprints; and
      determining a plausibility of the displacement of each pair relative to each of the other pairs based on the stored indications of plausible displacement between the possible pairs of first fingerprints; and
   controlling authentication of the user based on the determined plausibility of the displacement of each pair of fingerprints.

2. The method of claim 1, wherein, in the event that it is determined that a likelihood that the subsequent hand corresponds to the first hand is above a third threshold value, updating at least one of: (i) the stored features of the first fingerprints, and (ii) the stored indications of plausible displacement between first fingerprints, wherein said update is based on the second fingerprint data.

3. The method of claim 1, wherein the degree of similarity between the first and second fingerprints is determined based on both: (i) a confidence score of the match of respective features of the first and second fingerprints, and (ii) a rototranslation between the two fingerprints.

4. The method of claim 3, wherein controlling authentication of the user is based on a final global score, which is determined based on both: (i) the determined degree of similarity between the first fingerprints and the second fingerprints, and (ii) the determined plausibility of the displacement of each pair of fingerprints.

5. The method of claim 4, wherein in the event that the final global score is greater than a second threshold value, it is determined that the first and second fingerprint data belong to the same user.

6. The method of claim 1, wherein pairs of fingerprints are only identified for pairs where it is determined that the respective first and second fingerprints have a degree of similarity above a first threshold value.

7. The method of claim 1, wherein determining the plausibility of the displacement of each pair relative to each of the other pairs is based on: both (i) a reference point for the first fingerprint for each of the two pairs and (ii) a rototranslation between the first fingerprint and its subsequent fingerprint for each of the two pairs.

8. The method of claim 1, wherein, in the event that it is determined that a likelihood that the subsequent hand corresponds to the first hand is above a third threshold value, updating at least one of: (i) the stored features of the first fingerprints, and (ii) the stored indications of plausible displacement between first fingerprints, wherein said update is based on the second fingerprint data;
wherein the degree of similarity between the first and second fingerprints is determined based on both: (i) a confidence score of the match of respective features of the first and second fingerprints, and (ii) a rototranslation between the two fingerprints;
wherein controlling authentication of the user is based on a final global score, which is determined based on both: (i) the determined degree of similarity between the first fingerprints and the second fingerprints, and (ii) the determined plausibility of the displacement of each pair of fingerprints; and
wherein the determined likelihood that the subsequent hand corresponds to the first hand comprises the final global score, and in the event that the final global score is above the third threshold value, the method comprises updating the at least one of: (i) the stored features of the first fingerprints, and (ii) the stored indications of plausible displacement between first fingerprints, wherein said update is based on the second fingerprint data.

9. An electronic device comprising a fingerprint sensor, which is capable of simultaneously acquiring a plurality of fingerprints of a hand, memory means and processing means, configured to implement the method of claim 1.

10. A non-transitory computer program product, which is loadable in the memory means of an electronic device comprising processing means and is designed to implement, when executed by said processing means, the non-transitory computer program product configured to implement the method according to claim 1.

11. An enrolment method of preparing an electronic device comprising a fingerprint sensor to authenticate a user using the fingerprint sensor, the method comprising:
obtaining first fingerprint data of a first hand using the fingerprint sensor;
determining, and storing, features of first fingerprints of respective fingers of the first hand; and
determining, for each one of the possible pairs of first fingerprints, an indication of plausible displacement between the two first fingerprints on the fingerprint sensor; and
storing the indication of plausible displacement for each of the possible pairs to enable the electronic device to control authentication of a user based on both: (i) the stored indications of plausible displacement between two first fingerprints, and (ii) second fingerprint data of a subsequent hand using the fingerprint sensor.

12. A comparison method of authenticating a user using an electronic device comprising a fingerprint sensor, the method comprising:
obtaining second fingerprint data of a subsequent hand using the fingerprint sensor;
determining features of second fingerprints of respective fingers of the subsequent hand;
determining a degree of similarity between each one of a plurality of stored first fingerprints from a first hand and each one of the second fingerprints based on a comparison of respective features of the first and second fingerprints;
identifying pairs of fingerprints, each pair comprising one of the stored first fingerprints and the second fingerprint which has the highest degree of similarity to said one of the stored first fingerprints;
determining a plausibility of the displacement of each pair relative to each of the other pairs based on a stored indication of plausible displacement between possible pairs of the first fingerprints; and
controlling authentication of the user based on the determined plausibility of the displacement of each pair of fingerprints.

* * * * *